(12) United States Patent
Kounavis et al.

(10) Patent No.: US 11,704,297 B2
(45) Date of Patent: Jul. 18, 2023

(54) COLLISION-FREE HASHING FOR ACCESSING CRYPTOGRAPHIC COMPUTING METADATA AND FOR CACHE EXPANSION

(71) Applicant: Intel Corporation, Santa Clara, CA (US)

(72) Inventors: Michael E. Kounavis, Portland, OR (US); Santosh Ghosh, Hillsboro, OR (US); Sergej Deutsch, Hillsboro, OR (US); Michael LeMay, Hillsboro, OR (US); David M. Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/868,467

(22) Filed: Jul. 19, 2022

(65) Prior Publication Data

US 2022/0350785 A1 Nov. 3, 2022

Related U.S. Application Data

(63) Continuation of application No. 16/912,378, filed on Jun. 25, 2020, now Pat. No. 11,429,580.

(51) Int. Cl.
*G06F 16/22* (2019.01)
*G06F 16/2457* (2019.01)
(Continued)

(52) U.S. Cl.
CPC ........ *G06F 16/2255* (2019.01); *G06F 9/3885* (2013.01); *G06F 16/24552* (2019.01);
(Continued)

(58) Field of Classification Search
CPC .............. G06F 16/2255; G06F 9/3885; G06F 16/24552; G06F 16/24573; G06F 21/602;
(Continued)

(56) References Cited

U.S. PATENT DOCUMENTS

| 2012/0136889 A1 | 5/2012 | Jagannathan et al. |
| 2015/0052309 A1 | 2/2015 | Philip et al. |

(Continued)

FOREIGN PATENT DOCUMENTS

| CN | 113849804 A | 12/2021 |
| EP | 3930257 A1 | 12/2021 |

OTHER PUBLICATIONS

EP Patent Application No. 20211372.6 "Extended European Search Report" dated Aug. 2, 2021, 11 pages.
(Continued)

*Primary Examiner* — Albert M Phillips, III
(74) *Attorney, Agent, or Firm* — Jaffery Watson Mendonsa & Hamilton LLP

(57) ABSTRACT

Embodiments are directed to collision-free hashing for accessing cryptographic computing metadata and for cache expansion. An embodiment of an apparatus includes one or more processors to: receive a physical address; compute a set of hash functions using a set of different indexes corresponding to the set of hash functions, wherein the set of hash functions combine additions, bit-level reordering, bit-linear mixing, and wide substitutions, wherein the plurality of hash functions differ in the bit-linear mixing; access a plurality of cache units utilizing the set of hash functions; read different sets of the plurality of cache units in parallel, where a set of the different sets is obtained from each cache unit of the plurality of cache units; and responsive to the physical
(Continued)

address being located one of the different sets, return cache line data of the set corresponding to the set of the cache unit having the physical address.

20 Claims, 10 Drawing Sheets

(51) Int. Cl.
    *G06F 16/2455*     (2019.01)
    *G06F 9/38*     (2018.01)
    *G06F 21/60*     (2013.01)
    *G06F 21/62*     (2013.01)
    *H03M 13/00*     (2006.01)

(52) U.S. Cl.
    CPC ...... *G06F 16/24573* (2019.01); *G06F 21/602* (2013.01); *G06F 21/6218* (2013.01); *H03M 13/6516* (2013.01)

(58) Field of Classification Search
    CPC ...... G06F 21/6218; G06F 21/45; G06F 21/64; H03M 13/6516; H04L 9/3239
    See application file for complete search history.

(56) References Cited

U.S. PATENT DOCUMENTS

| | | |
|---|---|---|
| 2016/0099810 A1 | 4/2016 | Li et al. |
| 2016/0239265 A1 | 8/2016 | Duong et al. |
| 2020/0117810 A1 | 4/2020 | Kounavis et al. |
| 2021/0406239 A1 | 12/2021 | Kounavis et al. |

OTHER PUBLICATIONS

Karp, Richard M. et al. "Efficient PRAM Simulation on a Distributed Memory Machine," Theory of Computing, ACM, 2 Penn Plaza, Suite 701, New York, NY 10121-0701 USA, Jul. 1, 1992, pp. 318-326, XP058191559.

Kounavis et al. "K-Cipher: a Low Latency, Bit Length Parameterizable Cipher" Intel Labs, Hillsboro, OR, Nov. 2019, pp. 1-7.

Kounavis, Cryptographic Constructions Supporting Implicit Data Integrity, pp. 1-54, May (Year: 2018).

U.S. Appl. No. 16/912,378 "Non-Final Office Action" dated Jan. 3, 2022, 19 pages.

U.S. Appl. No. 16/912,378 "Notice of Allowance" dated May 2, 2022, 8 pages.

COLLISION-FREE HASHING FOR ACCESSING CRYPTOGRAPHIC COMPUTING METADATA AND FOR CACHE EXPANSION

RELATED APPLICATIONS

This application claims the benefit of priority from and is a continuation of U.S. patent application Ser. No. 16/912,378 filed on Jun. 25, 2020, now U.S. Pat. No. 11,429,580, the full disclosure of which is incorporated herein by reference.

TECHNICAL FIELD

Embodiments described herein generally relate to the field of computing systems and, more particularly, collision-free hashing for accessing cryptographic computing metadata and for cache expansion.

BACKGROUND

Cryptographic computing may refer to solutions for computer system security that employ cryptographic mechanisms inside processor components. Some cryptographic computing systems may employ encryption and/or other cryptographic mechanisms inside a processor core on memory pointers or user data before such data leaves the processor boundary and enters some external memory unit or is communicated to some other device. Such cryptographic operations often involve accessing table data. In the context of cryptographic security, table data can be security metadata, which may include permission bits, policy metadata, message authentication codes (MACs), integrity check values, and so on. Even though many cryptography operations can eliminate much of such table data, much of the security metadata stored as table data is likely to be present in computing architectures.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
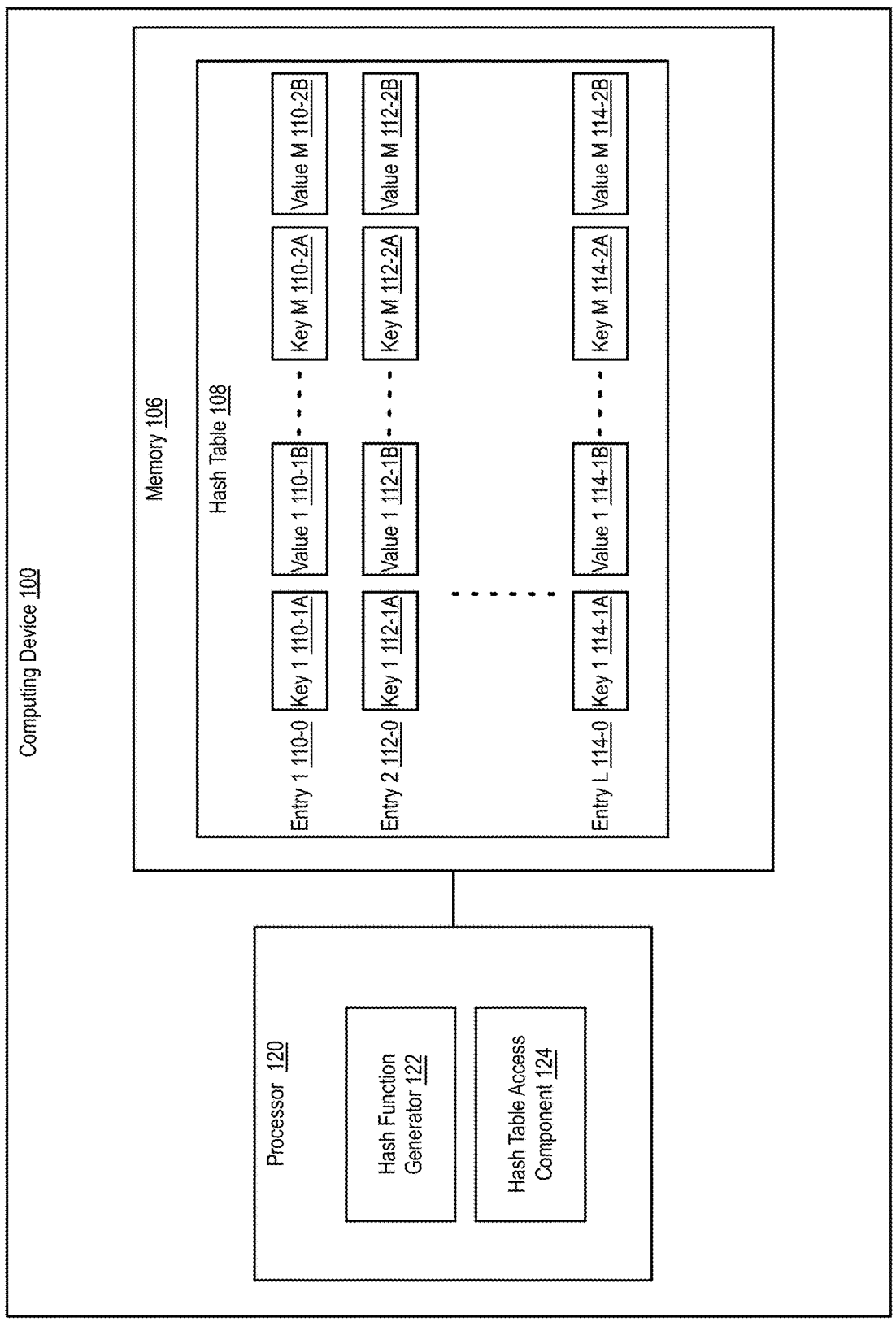
FIG. 1 illustrates a computing device for collision-free hashing for accessing cryptographic computing metadata and for cache expansion, in accordance with certain embodiments.

Various embodiments are directed to techniques for collision-free hashing for accessing cryptographic computing metadata and for cache expansion, for instance.

Many of the functions performed by computing architectures involve accessing table data. In the context of security, table data stored in tables can include security metadata, which may include permission bits, policy metadata, message authentication codes (MACs), Integrity Check Values, and so on. Even though cryptography can eliminate much of such metadata, it is likely to be present in future computing architectures.

In several cases, tables are accessed using indexes that may include a large number of bits, such as 40-bit physical addresses values. When this happens, large 'flat' table implementations, potentially containing entries for all possible index values, can be quite costly. This is because such flat tables use reserving large memory areas in advance. Alternatively, tables can be realized via tree structures built dynamically and traversed by hardware or software. Tree structures work better than flat tables, but allocate at least as much memory as the memory used for flat tables in the some cases, and involve several memory accesses in the critical path. The third alternative of employing hash tables has traditionally been considered difficult to realize in hardware. This is due to utilization of efficiently handling collisions. Hash table algorithms have been a subject of research for decades.

Numerous solutions have been proposed to address collisions in hash tables, including open addressing, coalesced hashing, Cuckoo hashing, and Robin Hood hashing. These solutions attempt to minimize the table access overhead or the probability of collisions. However, these solutions either reduce the probability of collisions at the cost of the hash functions employed, or employ complex collision handling mechanisms. Such mechanisms often involve several table accesses in the critical path, are difficult to realize in hardware state machines, and/or utilize procedures that displace entries inside tables. Furthermore, keeping the hash tables loaded at high percentages of their maximum capacity (e.g., 80%-90%) while supporting arbitrary sets of index inputs at low cost remains a challenge.

Embodiments of the disclosure address the above-noted challenges of efficient hash tables by providing collision-free hashing for accessing cryptographic computing metadata and for cache expansion. The collision-free approach of implementations of the disclosure allows for building hash tables for storing and accessing security metadata, including cryptographic computing metadata. The collision-free approach of implementations of the disclosure does not invoke any collision handling mechanism or process, is simple and area efficient when realized in hardware (e.g., utilizing 35,988 gates in total and 0.4 nanosecond expected processing time in the critical path, in the 10 nm process), supports insertion and read operations in 1.46-1.74 memory accesses on average, and allows tables to operate at up to a large percentage (e.g., 85-93%) of their maximum capacity for arbitrarily different access patterns. Implementations of the disclosure may also be used to provide for expanded cache access but allowing a set of lower level caches to act as a single larger unit of cache via utilization of a plurality of cryptographic hash functions to access each of the lower level cache units in parallel. Implementations of the disclosure can also be used outside of the context of security, such as, for example, in any architectural component of artificial intelligence (AI) that utilizes storing and accessing table data efficiently.

In implementations of the disclosure, a plurality of different hash functions (cryptographic hash functions) are generated by a hash function generator in order to access a hash table or to be used for cache access expansion. In one embodiment, the plurality of different hash functions are cryptographically-strong hash functions that combine additions with carries, bit-level reordering, bit-linear mixing that differs for each of the plurality of different hash functions, and wide substitutions. In one implementation, the plurality of hash functions are keyed hash functions that share operations comprising the additions with carries, the bit-level reordering, and the wide substitutions, but utilize different keys. The plurality of different hash functions provided by implementations of the disclosure reduces collisions in hashing and improves overall memory utilization in the computing architecture.

FIG. 1 illustrates a computing device 100 for collision-free hashing for accessing cryptographic computing metadata and for cache expansion in accordance with certain embodiments. Computing device 100 may generally have computing functionality (e.g., datacenter, cloud server, personal digital assistant, notebook computer, table computer, laptop, mobile device, etc.), imaging functionality (e.g., camera, projector, etc.), media playing functionality (e.g., smart television/TV, gaming platform, smart phone, etc.), wearable functionality (e.g., watch, eyewear, headwear, footwear, jewelry, etc.), vehicular functionality (e.g., car, truck, motorcycle, etc.), and so on. The computing device 100 may also include communications functionality for a wide variety of purposes.

In the illustrated example, computing device 100 may include a processor 120 and memory 106. The processor 120 may be a microprocessor, an embedded processor, a digital signal processor (DSP), a central processing unit (CPU), a graphical processing unit (GPU), a visual processing unit (VPU), a network processor, a hardware accelerator, hardware that executes code to implement one or more aspects of the technology described herein, etc. For example, the processor 120 may include one or more cores to execute operations (e.g., a single-threaded core, a multi-threaded core including more than one hardware thread context (or "logical processor") per core, etc.). The processor 120 may also be communicatively coupled to internal storage such as a cache (e.g., instruction cache, data cache, single level cache, multilevel cache, shared cache, strictly inclusive cache, exclusive cache, etc.), and so on.

In the illustrated example, the processor 120 is communicably coupled (e.g., via a memory controller (not shown), etc.) to a memory device, such as memory 106. Memory 106 may include, for example, random access memory (RAM), read-only memory (ROM) (e.g., programmable read-only memory (PROM), erasable PROM (EPROM), electrically EPROM (EEPROM), etc.), phase change memory (PCM), a three dimensional cross-point memory device (3DXP), and so on.

Processor 120 may also include a combination of hash function generator 122 and hash table access component 124 to provide collision-free hashing for accessing cryptographic computing metadata in accordance with implementations of the disclosure. Embodiments of the hash function generator 122 and hash table access component 124 may be implemented in hardware, software, or any combination thereof including at least a partial implementation in hardware. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS), or transistor-transistor logic (TTL) technology, or any combination thereof.

In implementations of the disclosure, hash function generator 122 and hash table access component 124 provide for a collision-free approach to building hash tables for storing and accessing security metadata, including cryptographic computing metadata. In one implementation, a hash table 108 may be implemented in memory 106.

In the context of security, hash table 108 may be utilized to store security and/or cryptographic computing metadata. Such metadata may include, but is not limited to, permission bits, policy metadata, MACs, Integrity Check Values, and so on. Hash function generator 122 and hash table access component 124 may interact with hash table 108 using the collision-free approach in order to access the security metadata of hash table 108 in implementations of the disclosure.

In one implementation, hash table 108 can support open addressing. In open addressing, each entry (e.g., entry 1 110-0, entry 2 112-0, . . . , entry L 114-0) of the hash table 108 includes several key-value pairs. In the example depiction of hash table 108, entry 1 110-0 includes key-value pairs 110-1A, 110-1B thru 110-2A, 110-2B; entry 2 112-0 includes key-value pairs 112-1A, 112-1B thru 112-2A, 112-2B; and so on through entry L 114-0, which includes key-value pairs 114-1A, 114-1B thru 114-2A, 114-2B.

In implementations of the disclosure, the hash table access component 124 utilizes a plurality of different hash functions generated by hash function generator 122 to access the hash table 108. In one embodiment, the plurality of different hash functions are cryptographically-strong hash functions that combine additions with carries, bit-level reordering, bit-linear mixing that differs for each of the plurality of hash functions, and wide substitutions over a small number of rounds. In one implementation, the plurality of hash functions are keyed hash functions that share operations comprising the additions with carries, the bit-level reordering, and the wide substitutions, but utilize different keys.

Figure 2:
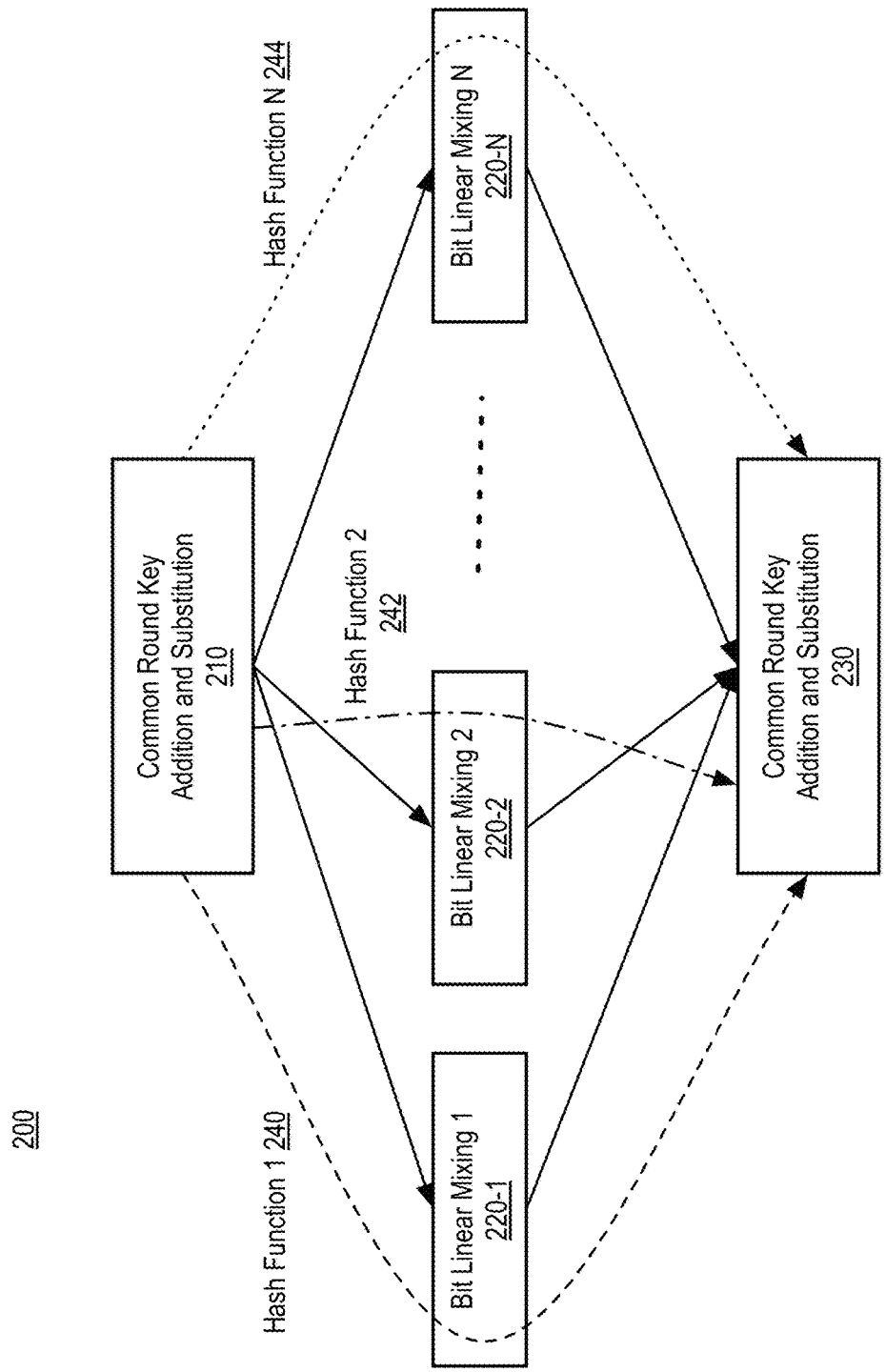
FIG. 2 a schematic diagram detailing an example hash function design for collision-free hashing for accessing cryptographic computing metadata, in accordance with implementations of the disclosure.

FIG. 2 is a schematic diagram detailing an example hash function design 200 for collision-free hashing for accessing cryptographic computing metadata in accordance with implementations of the disclosure. In one implementation, the hash function design 200 may be utilized by hash function generator 122 of FIG. 1 to generate a plurality of N different hash functions that are used to resolve to locations (e.g., entries 110-0 through 114-0) in hash table 108. The value of "N" may vary depending on the particular implementation of the hash table and hash function design. For example, the N different hash functions of hash function design 200 are shown as hash function 1 240, hash function 2 242, and so on through hash function N 244.

In the example hash design 200, a first stage 210 of the hash design 200 is common round key addition and substitution. In one implementation, the round key addition and substitution of the first stage 210 are referred to as "common" because the round key addition and substitution processing can be applied uniformly in each of the N different hash functions 240, 242, 244 generated using hash function design 200. The common round key addition and substitution of the first stage 210 may include a plurality of processes including, but not limited to, additions with carriers, bit-level reordering, and wide substitutions. The common round key addition and substitution of the first stage 210 utilizes secret information, such as a key, to tweak the computation of the hash function. Further details regarding the common round key and substitution process are discussed below with respect to FIG. 3.

The first stage 210 is followed by a second stage 220 of bit linear mixing. The second stage 220 (i.e., collectively referring to bit linear mixing 1 220-1, bit linear mixing 2 220-2, through bit linear mixing N 220-N) of bit linear mixing can differ for each hash function 240, 242, 244 generated using hash function design 200. For example, a first hash function 1 240 of the plurality of hash functions uses bit linear mixing 1 220-1 operations, a second hash function 2 242 of the plurality of hash functions uses bit linear mixing 2 220-2 operations, and so on until the final hash function N 244 uses bit linear mixing N 220-N operations. This differentiation at the second stage 220 using bit linear mixing provides for the plurality of N different hash functions 240, 242, 244 by hash function design 200. The bit linear mixing process of the second stage 220 may refer to multiplying an input vector with a matrix that results in an output vector of smaller dimensionality. Further details regarding the bit linear mixing process are discussed below with respect to FIG. 3.

In implementations of the disclosure, the second stage 220 is followed by a third stage 230 of another set of common round key addition and substitution processes. The common round key addition and substitution of the third stage 230 may include a plurality of processes including, but not limited to, additions with carriers, bit-level reordering, and wide substitutions. Further details regarding the common round key and substitution process are discussed below with respect to FIG. 3.

Figure 3:
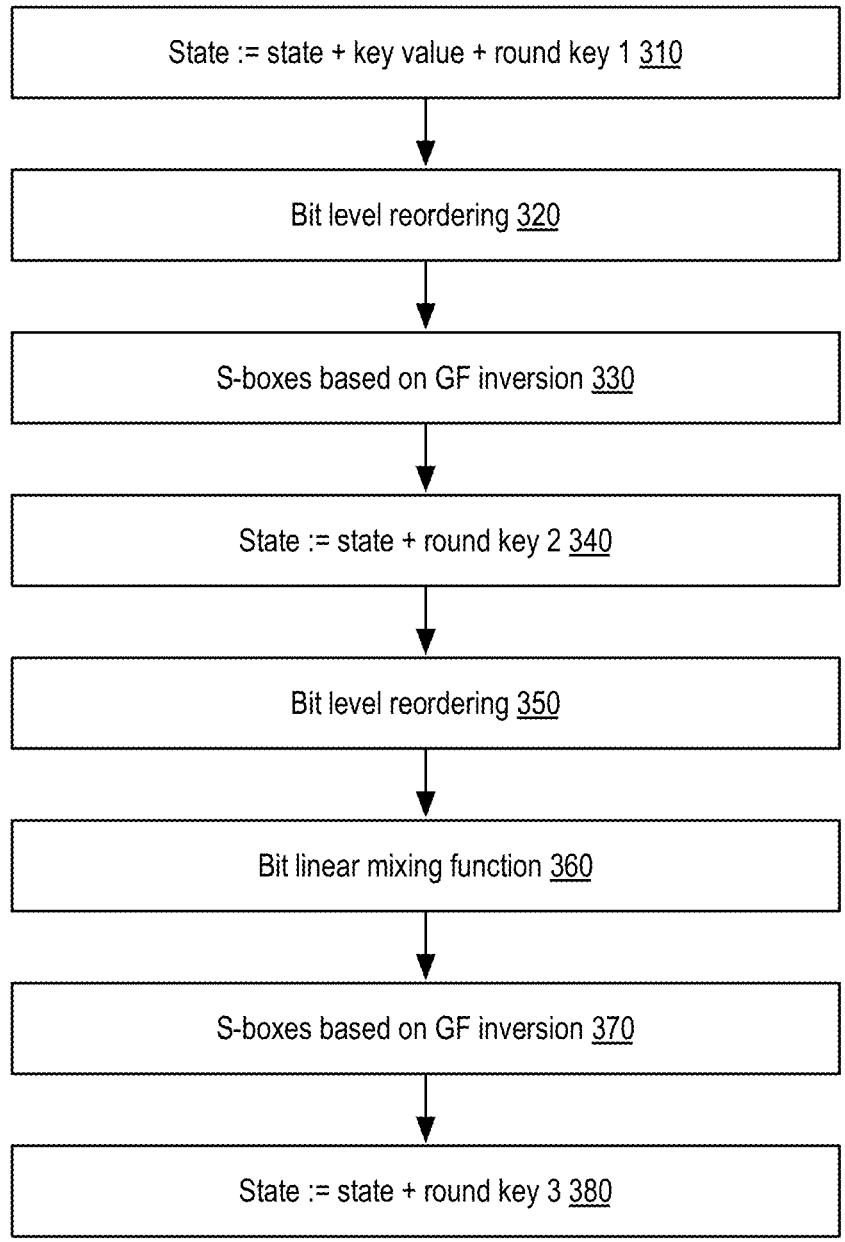
FIG. 3 illustrates a flow diagram of an example hash function implementing collision-free hashing for accessing cryptographic computing metadata in accordance with implementations of the disclosure.

FIG. 3 illustrates a flow diagram of an example hash function 300 implementing collision-free hashing for accessing cryptographic computing metadata in accordance with implementations of the disclosure. Hash function 300 may be one example implementation of hash function design 200 described with respect to FIG. 2. Although shown in a particular order, the processes and/or stages of hash function 300 may be ordered in a different combination or subcombination and are not limited to the particular order or set of processes described herein. In one implementation, the hash function 300 may be utilized by hash function generator 122 of FIG. 1 to generate a plurality of N different hash functions that are used to resolve to locations (e.g., entries 110-0 through 114-0) in hash table 108.

Hash function 300 begins with a first stage 310 of adding. The addition of the first stage 310 takes as input a state, and then adds to this state a value of a supplied key and a first round key. The addition performed may be integer arithmetic. Integer addition, if seen as a bit-logical operation, performs strong mixing of its input bits, in order to produce the bits of the output. The mixing performed demonstrates regularity due to the use of carry values. The term "mixing" may refer to computations on single bit values that involve a plurality of AND, OR, NAND, NOR or XOR operations. The addition with carries of the first stage 310 can be a bit length independent operation. As such, its specification is independent of the length of the inputs. It may also be invertible, its inverse being the subtraction with borrows. In one implementation, any final carry out or borrow out signals produced from such operations can be ignored.

To remove the regularity which characterizes the addition with carries at the first stage 310, a second stage 320 of bit level reordering is performed on the addition output of the first stage 310. Such bit level reordering operation of the second stage 320 places the output bits coming from the first stage 310 in a seemingly random order, so that the number of Galois Field GF(2) products of the logic equation of the result no longer increases monotonically, but instead increases and decreases in a pseudorandom manner.

Furthermore, the bit level reordering operation of the second stage 320 aids the subsequent wide substitution stage of the third stage 330, contributing to each bit of the output of the hash function 300 resulting from mixing all bits of the input with all bits of the key. The wide substitution of the third stage 330 may be a substitution box (S-box) layer that is based on GF conversion.

In one example, the S-box layer of the third stage 330 may operate as follows. First, the S-box layer divides its input N bits into blocks of M bits. It can be assumed that N is a multiple of M. The cases where N is not a multiple of M are discussed further below. If N is a multiple of M, the S-box layer can employ an array of N=M inverters in GF(2^M) arithmetic which replace their input bits with the bits of the inverse in GF(2^M). Inversion in the Galois Field arithmetic GF(2^M) is an operation that supports strong bit mixing. The mixing performed by the Galois Field inverters employed by the hash function 300 does not demonstrate the regularity of addition with carries and is in fact pseudo-random. Hash function 300 is designed to support strong encryption security by employing additions and inversions in two unrelated types of arithmetic (i.e., Galois Field and integer) and by combining those into sequences of few rounds.

The S-box layer of the third stage 330 may be bit length independent provided that the length of the state of the cipher N is a multiple of the width of the inverters employed M. In this case, the specification of the cipher is generic and each wide substitution stage employs N=M inverters. If N is not a multiple M, then there may be m substitution boxes of width M that are employed, plus one more of width K=N−m*M, where K is non-zero. In one implementation, the substitution stage of the S-box layer of the third stage 330 can employ m inverters in the GF(2^M) arithmetic and one inverter in the GF(2K) arithmetic handling the last K bits of the cipher state.

The processing of hash function 300 may employ at least two rounds of adding and bit level reordering. As such, a fourth stage 340 of hash function 300 may include a second process of round key addition, where a second round key is added to an input state, similar to the process described with respect to the first stage 310. At the fifth stage 350, a second round of bit level reordering may be performed on the output of the addition of the fourth stage 340.

The sixth stage 360 takes the output of the fifth stage 350 and performs a bit linear mixing function on the output. While all other stages 310-350, 370-370 of hash function 300 are the same for each iteration of hash function 300, the bit linear mixing function at stage 360 may differ for each iteration of the hash function generated by hash function 300. The bit linear mixing may refer to matrix multiplication, where the input vector to the bit linear mixing function is multiplied with a matrix that results in an output vector of smaller dimensionality. The matrix used to multiply against the input vector may differ for each iteration of hash function 300.

As noted above, the output of the bit linear mixing function of the sixth stage 360 includes a state length that is reduced to an output index length. The seventh stage 370 of the hash function 300 receives this output and applies another wide substitution using S-boxes based on GF inversion. This stage is similar in operation to the third stage 330 described above.

The final eighth stage 380 perform a final round key addition using a third round key with an input state provided to the eighth stage 380.

In one implementation, the generation of the index sequences employed by the hash function 300, which support bit level reordering, such as at stages 320, 350, can be accomplished by the following index sequence process: The index sequence process first determines the number of times d it should iterate over the bits of a substitution box in order to distribute these bits over all substitution boxes. These bits of a substitution box may be referred to as "bits-to-be-reordered". The parameter d is equal to ceil(M/b). Then, for each of the d iterations, the algorithm generates a random sequence of numbers. These are the indexes of the substitution boxes where the "bits-to-be-reordered", associated with the current iteration, are to be placed. Subsequently, for each "bit-to-be-reordered", the index sequence process picks a bit position at random from among the empty bit positions in the input bit's target substitution box and assigns this position to the bit. This last step can be repeated for all iterations of a triply nested loop performed by the index sequence process.

The index sequence process produces sequences of indexes where each bit of the input is placed in a different bit position of the output and there is no input which is omitted from the output. Moreover, the index sequence process produces sequences of indexes where, if such reordering operations are combined with wide substitution operations, then, after log MN rounds all bits of the input have been fully mixed with each other, even if additions with carries are absent. In some embodiments, the entire sequence of steps of FIG. 3 may be repeated more than one time.

Referring back to FIG. 1, the hash table access component 124 may utilize hash function generator 122 to perform collision-free hashing for accessing cryptographic computing metadata stored in the hash table 108. In one implementation, hash table access component 124 can utilize hash function generator 122 to apply a hash function, such as hash function 300 described with respect to FIG. 3, in order to access hash table 108. Hash table access component 124 may access hash table 108 via a read path and/or a write path, as described in more detail with respect to FIGS. 4 and 5 below.

Collision-free hashing may be useful for storing metadata in cases where the amount of metadata utilized is not pre-determined. For example, a single object may comprise a particular number of sub-objects that is not predictable based on information known to the memory allocator. It may be useful to control which distinct portions of a program may access different portions of an object. For example, an upper-level function may allocate a compound structure, i.e. a structure that contains multiple distinct fields. The upper-level function may invoke a subroutine (a lower-level function) that only utilizes access to one of the fields rather than the entire compound structure. In some embodiments, the upper-level function may first insert bounds covering the entire compound structure in a table using an instruction that performs collision-free hashing. Collision-free hashing may then be used to store additional bounds information for one or more sub-portions of the overall object. Data encryption for the object may be bound to the first encrypted pointer that covers the entire object.

For example, an INSERTBOUNDS instruction may be defined that accepts multiple operands including an encrypted pointer containing a field ID that is bound to the pointer, e.g. by encrypting or authenticating it, a lower bound, an upper bound, and a new field ID. The instruction may first decrypt the input pointer and use collision-free hashing based on the decrypted pointer and the field ID in the input pointer to lookup bounds. The instruction may then verify that the lower bound and upper bound operands are within the range specified by the range associated with the input pointer. If the new field ID is a special value indicating that the bounds cover the entire object, then the preceding checks may be skipped, since this invocation corresponds to the upper-level function creating the new object. Next, the INSERTBOUNDS instruction may use collision-free hashing to check that no bounds have previously been associated with the decrypted input pointer and the new field ID. Then, the INSERTBOUNDS instruction may generate a new pointer with an authenticated or encrypted reference to the new field ID.

Attempts to access a pointer may first load and check the associated bounds for that portion of the object using collision-free hashing.

In some implementations, a REMOVEBOUNDS instruction can be defined to remove the stored bounds for a provided pointer. An authenticated or encrypted indicator bit may be defined within the pointer to indicate whether that pointer may be used to remove the stored bounds for itself. The desired value for that bit may be provided as a parameter to INSERTBOUNDS.

In alternative embodiments, a variable number of Integrity-Check Values (ICVs) may be stored in association with integrity-protected objects, using collision-free hashing to lookup ICVs for particular portions of each object. Implicit integrity checks may be used to determine that certain encrypted data elements have not been corrupted as evidenced by their decrypted plaintext exhibiting low-entropy, since corrupted data elements can exhibit high entropy with high probability assuming that the cipher in use provides suitable bit diffusion. Only portions of the data that do not exhibit low entropy when decrypted require an ICV to be stored. An unpredictable number of those portions may exist and they may be located an unpredictable offsets within the object. It is beneficial to use collision-free hashing to locate the ICV for a given object portion within a variable-sized store of ICVs that may be stored inline with the object or separately.

Figure 4:
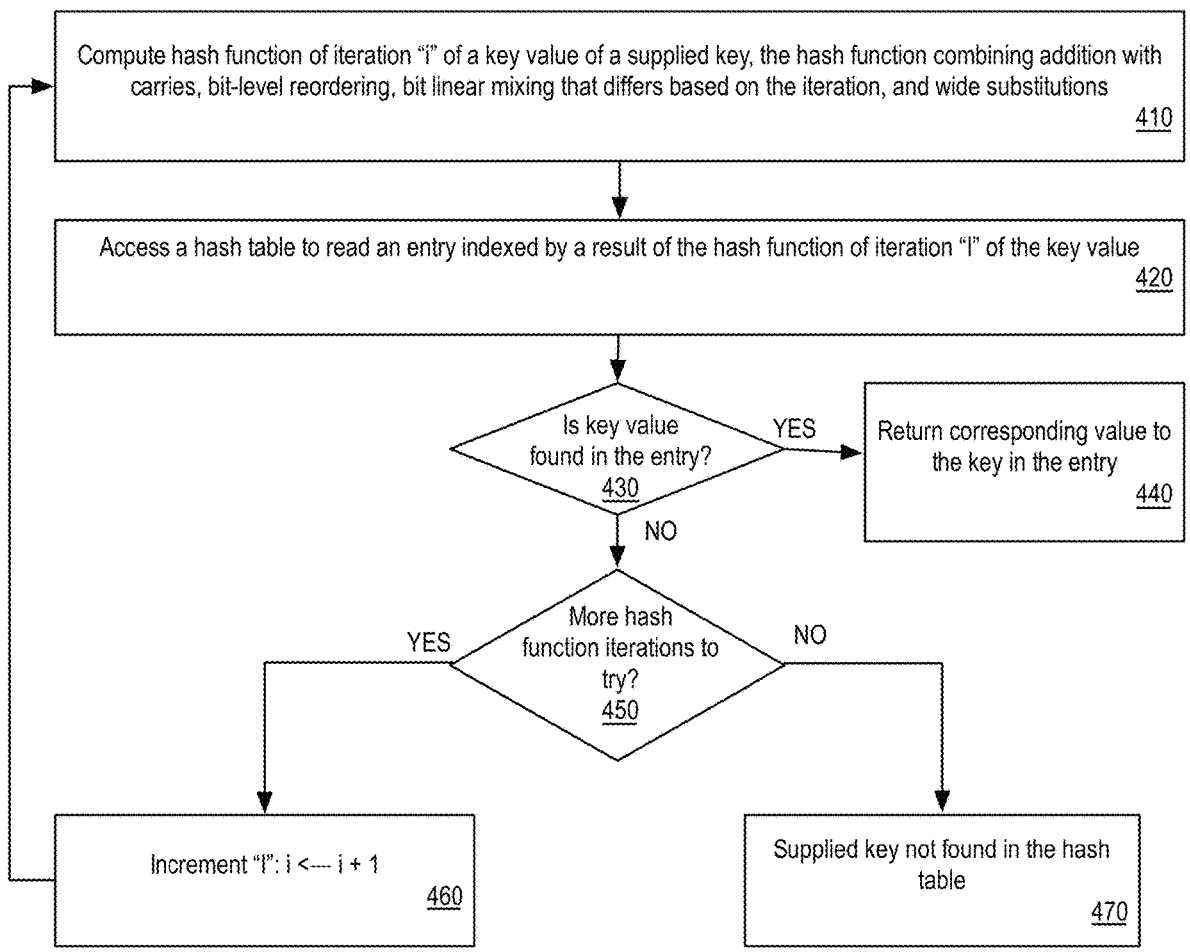
FIG. 4 illustrates an example flow for collision-free hashing for reading cryptographic computing metadata from a hash table, in accordance with certain embodiments.

FIG. 4 illustrates an example flow 400 for collision-free hashing for reading cryptographic computing metadata from a hash table, in accordance with certain embodiments. The various operations of the flow may be performed by any suitable circuitry, such as a processor or processing unit of a computing device, a controller of a computing device, a controller of a memory module, or other components of a computing device. The example flow 400 may be representative of some or all the operations that may be executed by or implemented on one or more components of computing device 100 of FIG. 1, such as hash table access component 124 of processor 120. The embodiments are not limited in this context.

At block 410, the processor computes a hash function of iteration "i" using a value of a supplied key. In one implementation, the hash function combines addition with carries, bit level reordering, bit linear mixing that differs based on the particular iteration "i" of the hash function, and wide substitutions. In one implementation, the hash function is the same as hash function 300 described with respect to FIG. 3.

At block 420, the processor accesses a hash table to read an entry indexed by a result of the hash function of iteration "i" of the key value performed at block 410. At decision block 430, it is determined whether the key value is found in any of the slots of the entry accessed at block 420. If so, then flow 400 proceeds to block 440, where the processor returns a corresponding value to the located key in the entry. On the other hand, if the key value is not found, flow 400 proceeds to decision block 450 where it is determined whether there are more hash function iterations, "i", to try.

If there are more iterations of the hash function to try, then flow 400 proceeds to block 460 where the processor increments the current iteration "i". In one implementation, the current iteration is incremented by one. Then flow 400 returns to block 410 to repeat operations of flow 400 for the next iteration of "i" of the hash function. If there are no more hash function iterations to try (e.g., all hash function iterations of "i" have been tried), then flow 400 proceeds to block 470 where the processor determines that the supplied key is not found in the hash table.

Figure 5:
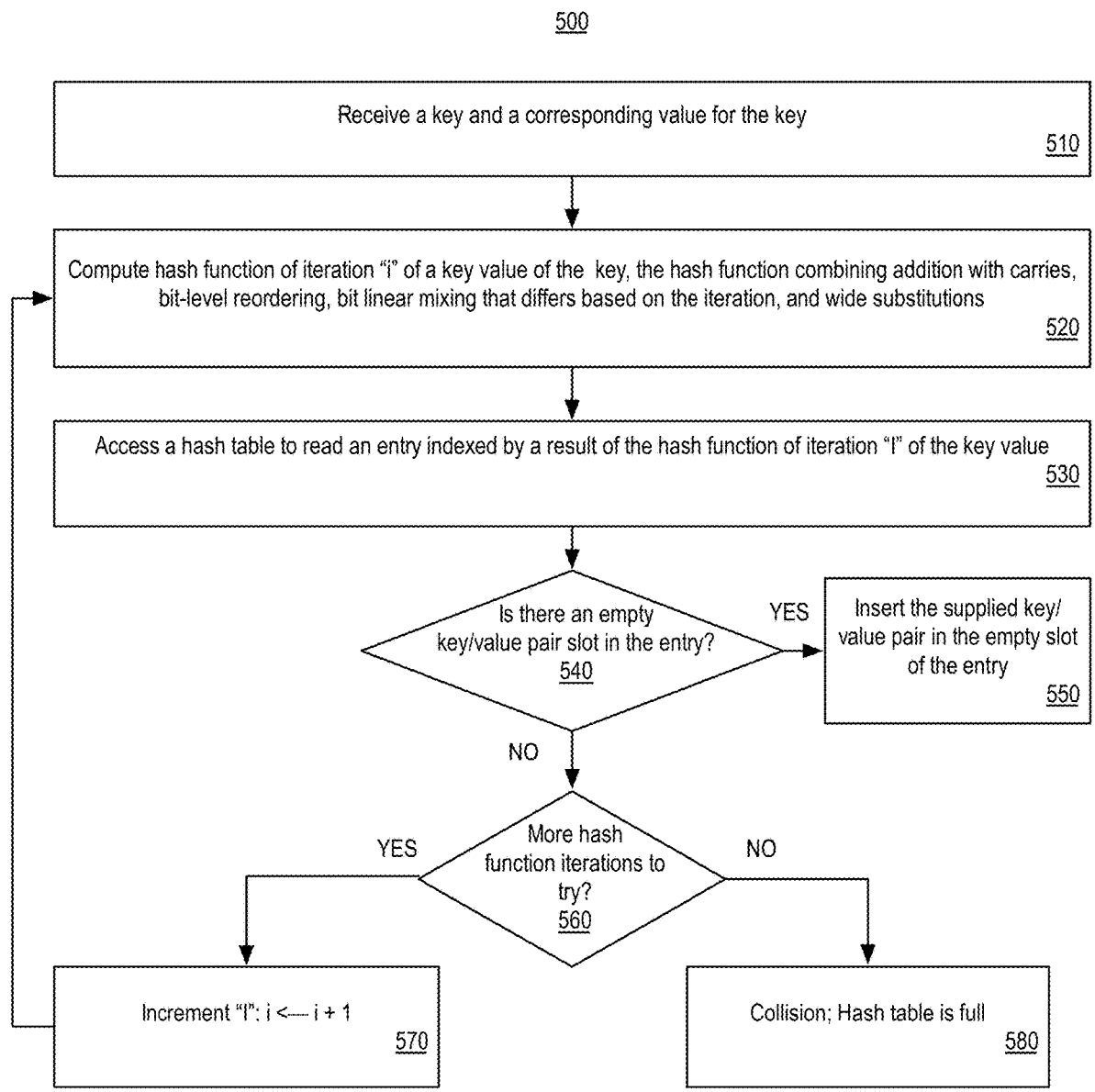
FIG. 5 illustrates an example flow for collision-free hashing for inserting cryptographic computing metadata to a hash table, in accordance with certain embodiments.

FIG. 5 illustrates an example flow 500 for collision-free hashing for inserting (e.g., writing) cryptographic computing metadata to a hash table, in accordance with certain embodiments. The various operations of the flow may be performed by any suitable circuitry, such as a processor or processing unit of a computing device, a controller of a computing device, a controller of a memory module, or other components of a computing device. The example flow 500 may be representative of some or all the operations that may be executed by or implemented on one or more components of computing device 100 of FIG. 1, such as hash table access component 124 of processor 120. The embodiments are not limited in this context.

At block 510, the processor receives a key and a corresponding value for the key. In one implementation, the key and corresponding value are destined for input into a hash table. At block 520, the processor computes a hash function of iteration "i" using the supplied key. In one implementation, the hash function combines addition with carries, bit level reordering, bit linear mixing that differs based on the particular iteration "i" of the hash function, and wide substitutions. In one implementation, the hash function is the same as hash function 300 described with respect to FIG. 3.

At block 530, the processor accesses a hash table to read an entry of the hash table indexed by a result of the hash function of iteration "i" of the key performed at block 520. At decision block 540, the processor determines whether there is an empty key-value pair slot in the entry accessed at block 530. If so, the flow 500 proceeds to block 550 where the processor inserts the supplied key and corresponding value pair into the empty slot of the entry.

On the other hand, if there is not an empty key-value pair slot in the entry at decision block 540, the flow 500 proceeds to decision block 560 where the processor determines whether there are more hash function iterations, "i", to try. If there are more iterations of the hash function to try, then flow 500 proceeds to block 570 where the processor increments the current iteration "i". In one implementation, the current iteration is incremented by one. Then flow 500 returns to block 520 to repeat operations of flow 500 for the next iteration of "i" of the hash function. If there are no more hash function iterations to try (e.g., all hash function iterations of "i" have been tried), then flow 500 proceeds to block 580 where the processor determines that a collision has occurred and that the hash table is full. As such, in implementations of the disclosure, no collision handling mechanisms are employed to implement the hash function and hash table described herein.

In some implementations of the disclosure, one round of iterations of the hash function may be sufficient to yield up to 93% collision-free table occupancy. In some implementations, 1-2 hash function iterations are used on average. Table 1 below provides a summary of example results of implementing the collision-free hashing as described herein.

TABLE 1

Summary of example results on collision free hashing

| input key/value pair pattern | input load (keys) | keys loaded successfully (%) | % of table entries that are empty | avg. memory accesses per insertion/read | area of the hash logic (gates) | hash logic delay (nsec) |
| --- | --- | --- | --- | --- | --- | --- |
| sequential keys | 3,145,728 | 85.89 | 3.18 | 1.64 | 35,988 | 0.4 |
| random keys | 3,145,728 | 86.53 | 2.28 | 1.46 | 35,988 | 0.4 |
| random sets of 1024 sequential keys | 3,145,728 | 93.22 | 0.90 | 1.74 | 35,988 | 0.4 |

In some implementations, the collision-free hashing for accessing cryptographic computing metadata may be applied as a cache expansion technique. A memory hierarchy, such as caches, can be accessed using a subset of the bits of an input address. Caches in general may be open to information leaking attacks. On the other hand, cryptographically protecting the index used for accessing the cache is expensive. Implementations of the disclosure address the above problem by introducing cryptography to the cache access technology to provide both security and higher performance.

Figure 6:
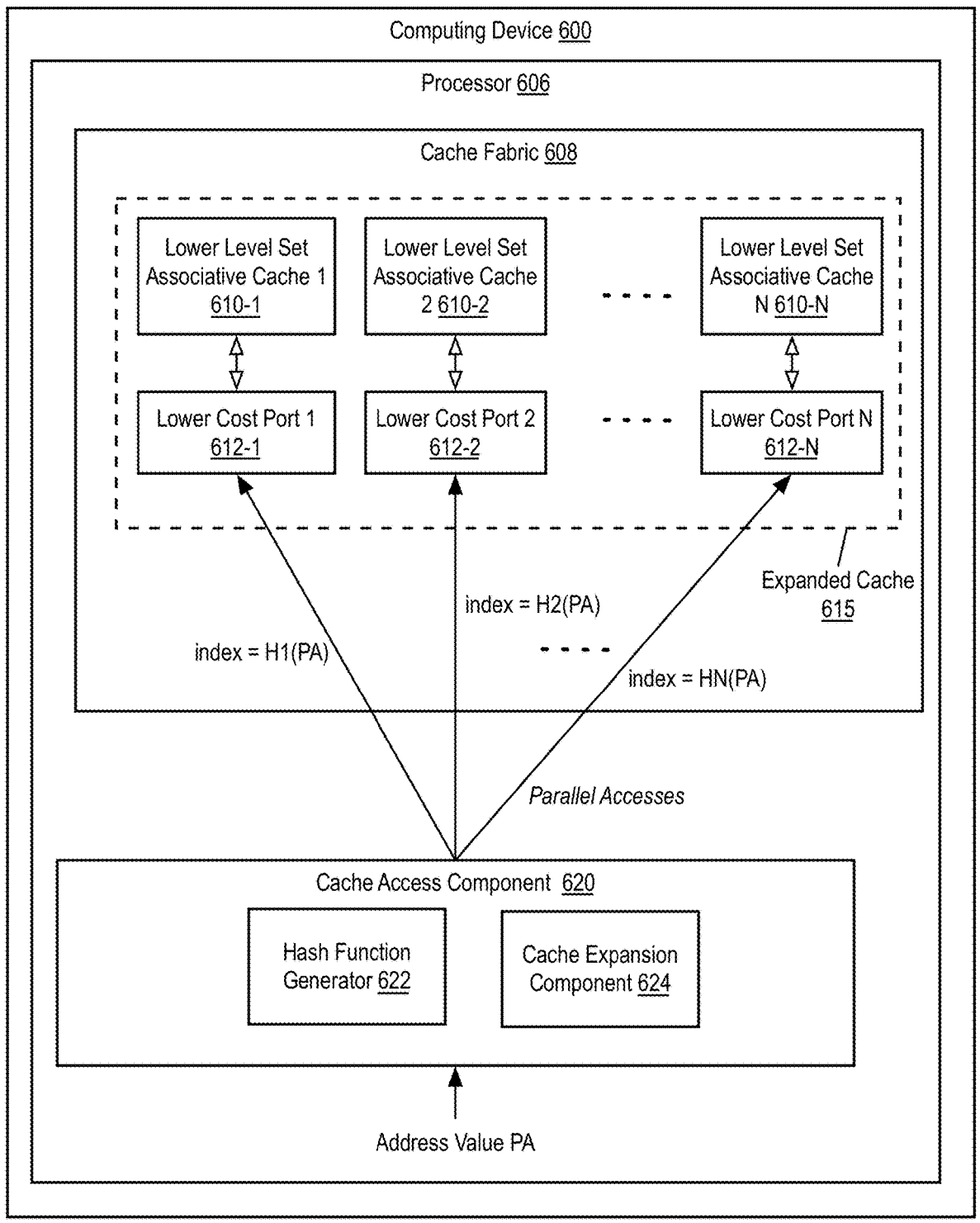
FIG. 6 is a block diagram illustrating collision-free hashing for accessing cryptographic computing metadata and for cache expansion in accordance with implementations of the disclosure.

FIG. 6 is a block diagram illustrating collision-free hashing for accessing cryptographic computing metadata and for cache expansion in accordance with implementations of the disclosure. In implementations of the disclosure, the collision-free hashing as described above with respect to FIGS. 1-5 may be applied as a cache expansion technique. Computing device 600 may include a processor 606 implementing a cache fabric 608 and a cache access component 620.

In one implementation, processor 606 may be the same as processor 120 described with respect to FIG. 1. Processor 606 may be a microprocessor, an embedded processor, a digital signal processor (DSP), a central processing unit (CPU), a graphical processing unit (GPU), a visual processing unit (VPU), a network processor, a hardware accelerator, hardware that executes code to implement one or more aspects of the technology described herein, etc. For example, the processor 606 may include one or more cores to execute operations (e.g., a single-threaded core, a multi-threaded core including more than one hardware thread context (or "logical processor") per core, etc.).

In one implementation, processor 606 is communicatively coupled to internal storage, such as cache fabric 608. Cache fabric 608 may refer to an architecture of cache structures that are interconnected and that may include one or more hierarchies of cache (e.g., L1 cache, L2 cache, LLC, memory controller, etc.), and further may include, but are not limited to, instruction cache, data cache, single level cache, multilevel cache, shared cache, strictly inclusive cache, exclusive cache, and so on. As illustrated in FIG. 6, cache fabric 608 includes a plurality of lower level set associative caches including lower level set associative cache 1 610-1, lower level set associative cache 2 610-2, through lower level set associative cache N 610-N (collectively referred to as lower level set associate caches 610). Each lower level set associative cache 610 may be communicably coupled to a corresponding lower cost port including lower cost port 1 612-1, lower cost port 612-2, through lower cost port N 612-N (collectively referred to as lower cost ports 612).

Processor 606 may also include a cache access component 620 that includes a combination of hash function generator 622 and cache expansion component 624 to provide collision-free hashing for accessing cryptographic computing metadata and for cache expansion, in accordance with implementations of the disclosure. Embodiments of the cache access component 620, including the hash function generator 622 and the cache expansion component 624, may be implemented in hardware, software, or any combination thereof including at least a partial implementation in hardware. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS), or transistor-transistor logic (TTL) technology, or any combination thereof.

In implementations of the disclosure, hash function generator 622 and cache expansion component 624 provide for a collision-free approach to expand cache capability using a cryptographically strong index. For example, cache expansion component 624 utilizes hash function generator 622 to provide low cost conversion of the input address bits into a cryptographically strong index, and use of N different lower level, lower cost cache units, each accessed using a different cryptographic hash function to implement a higher level cache.

In one implementation, hash function generator 622 is the same as hash function generator 122 described with respect to FIG. 1. As such, hash function generator 622 can implement the collision-free hash function 200, 300 as detailed in FIGS. 2 and 3 to perform cache accesses to cache fabric 608. As such, the cache expansion component 624 may utilize hash function generator 622 to apply a plurality of hash functions implementing hash function design 200 described with respect to FIG. 2 (e.g., hash function 300 of FIG. 3) to access entries or slots of cache fabric 608. The slots of cache fabric 608 may refer to specific entries in different cache lines (e.g., entries in different ways of different cache units of the lower level set associative caches 610).

The cache expansion component 624 can utilize the results of the hash functions to act as indexes into the lower level set associative caches 610. For example, an index into lower level set associative cache 1 610-1 may be the result of applying the hash function of iteration 1 (i=1) to the value of the supplied physical address (PA) (i.e., H1(PA)). Similarly, an index into lower level set associative cache 2 610-2 may be the result of applying the hash function of iteration 2 (i=2) to the value of the supplied PA (i.e., H2(PA)). Furthermore, an index into lower level set associative cache N 610-N may be the result of applying the hash function of iteration N (i=N) to the value of the supplied PA (i.e., HN(PA)).

As such, a plurality of smaller cache units can act as a larger cache unit (i.e., expanded cache unit 615) of larger capacity. For example, lower level set associative caches 610 may be accessed, in parallel, by cache expansion component 624 using a plurality of hash functions having hash function design 200 (of FIG. 2) generated by hash function generator 622. As such, the lower level set associate caches 610 can act as expanded cache unit 615 having a larger capacity. For example, 8 cryptographically accessed L1 units may be accessed as an L2 cache unit via the cache expansion component 624. In another example, 4 cryptographically accessed L2 units may be accessed as an L3 cache unit in via the cache expansion component 624.

Figure 7:
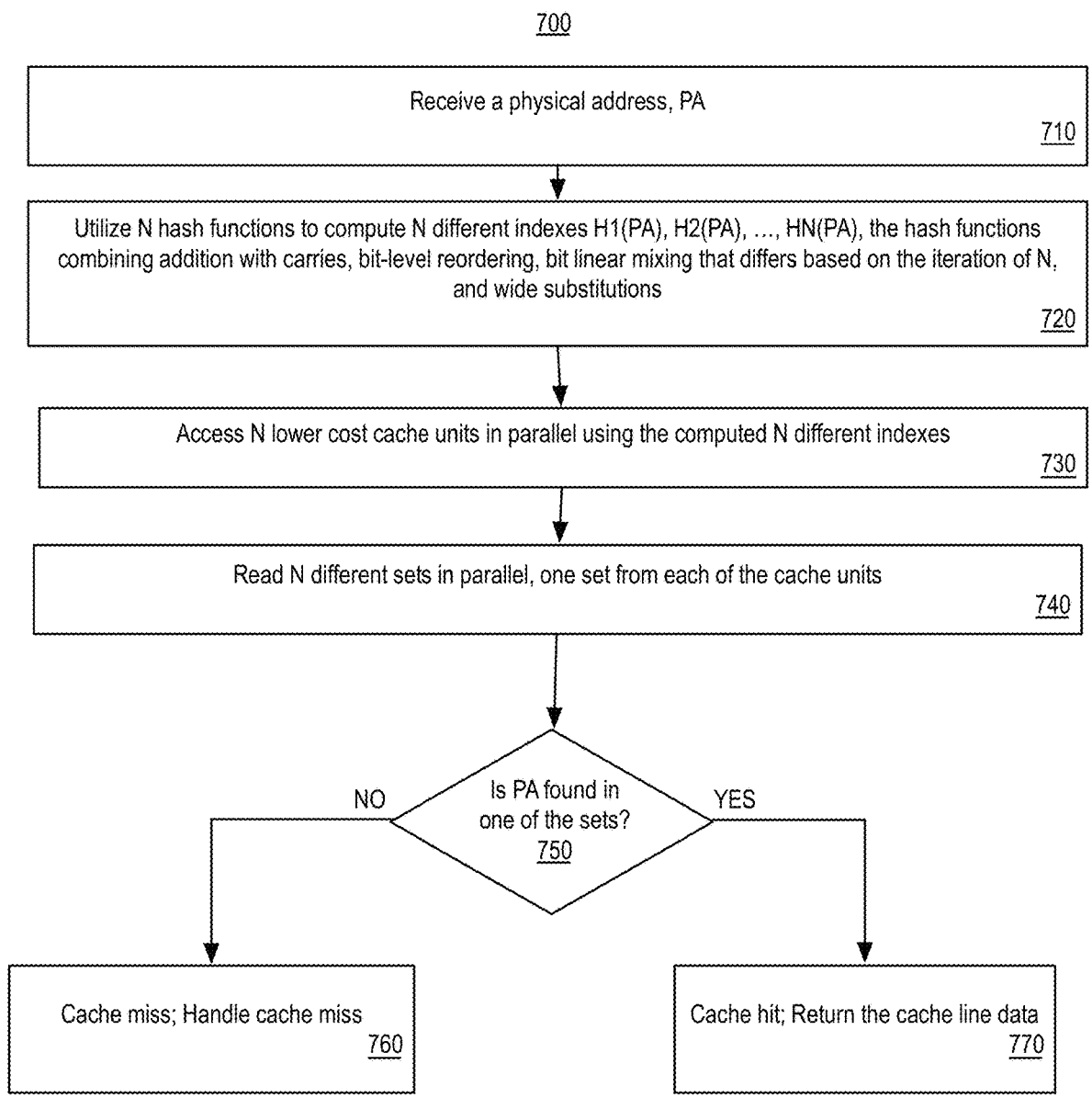
FIG. 7 illustrates an example flow for collision-free hashing for cache expansion on a read path, in accordance with certain embodiments.
Figure 8:
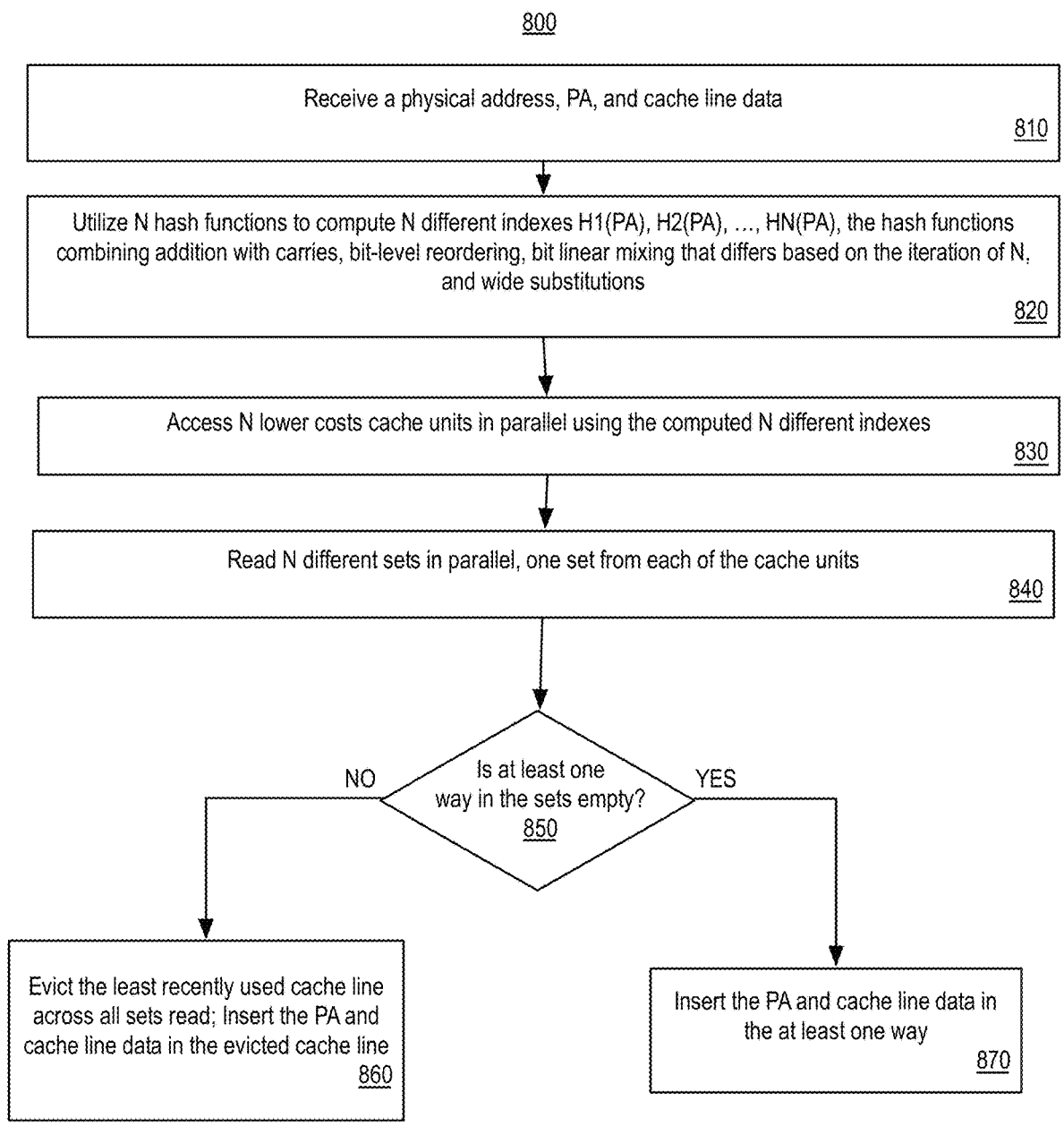
FIG. 8 illustrates an example flow for collision-free hashing for cache expansion on a write path, in accordance with certain embodiments.

In some implementations, cache access component 124 may access cache fabric 608 via a read path and/or a write path. FIGS. 7 and 8 discussed below detail the read and write paths, respectively, used to access cache fabric 608 via cache access component 620.

FIG. 7 illustrates an example flow 700 for collision-free hashing for cache expansion on a read path, in accordance with certain embodiments. The various operations of the flow may be performed by any suitable circuitry, such as a processor or processing unit of a computing device, a controller of a computing device, a controller of a memory module, or other components of a computing device. The example flow 700 may be representative of some or all the operations that may be executed by or implemented on one or more components of computing device 100 of FIG. 1 or computing device 600 of FIG. 6, such as cache access component 620. The embodiments are not limited in this context.

At block 710, the processor receives a physical address, PA. At block 720, the processor utilizes N hash functions to compute N different indexes, H1(PA), H2(PA), through HN(PA). In one implementation, the N hash functions combine addition with carries, bit level reordering, bit linear mixing that differs based on the particular iteration of N, and wide substitutions.

At block 730, the processor accesses N lower cost cache units in parallel using the computed N different indexes from block 720. At block 740, the processor reads N different sets in parallel, with one set from each of the lower cost cache units.

At decision block 750, the processor determines whether the PA was found in any of the sets. If not, then flow 700 proceeds to block 760 where the processor determines a cache miss occurs and executes a cache miss routine. On the other hand, if the PA is found in one of the sets at decision block 750, then flow 700 proceeds to block 770 where the processor determines that a cache hit has occurred and returns the cache line data.

FIG. 8 illustrates an example flow 800 for collision-free hashing for cache expansion on a write path, in accordance with certain embodiments. The various operations of the flow may be performed by any suitable circuitry, such as a processor or processing unit of a computing device, a controller of a computing device, a controller of a memory module, or other components of a computing device. The example flow 800 may be representative of some or all the operations that may be executed by or implemented on one or more components of computing device 100 of FIG. 1 or computing device 600 of FIG. 6, such as cache access component 620. The embodiments are not limited in this context.

At block 810, the processor receives a physical address, PA, and corresponding cache line data. At block 820, the processor utilizes N hash functions to compute N different indexes, H1(PA, H2(PA), through HN(PA). In one implementation, the N hash functions combine addition with carries, bit level reordering, bit linear mixing that differs based on the particular iteration of N, and wide substitutions.

At block 830, the processor accesses N lower cost cache units in parallel using the computed N different indexes from block 820. At block 840, the processor reads N different sets in parallel, with one set from each of the lower cost cache units.

At decision block 850, the processor determines whether at least one way in the sets is empty. If not, then flow 800 proceeds to block 860 where the processor evicts the least recently used (LRU) cache line across all sets that were read. In one implementation, the processor then inserts the PA and the corresponding cache line data in the evicted cache line. On the other hand, if there is at least one way that is empty in the sets that were read, then flow 800 proceeds to block 870 where the processor inserts the PA and the corresponding cache line data into the at least one way that is empty.

Figure 9:
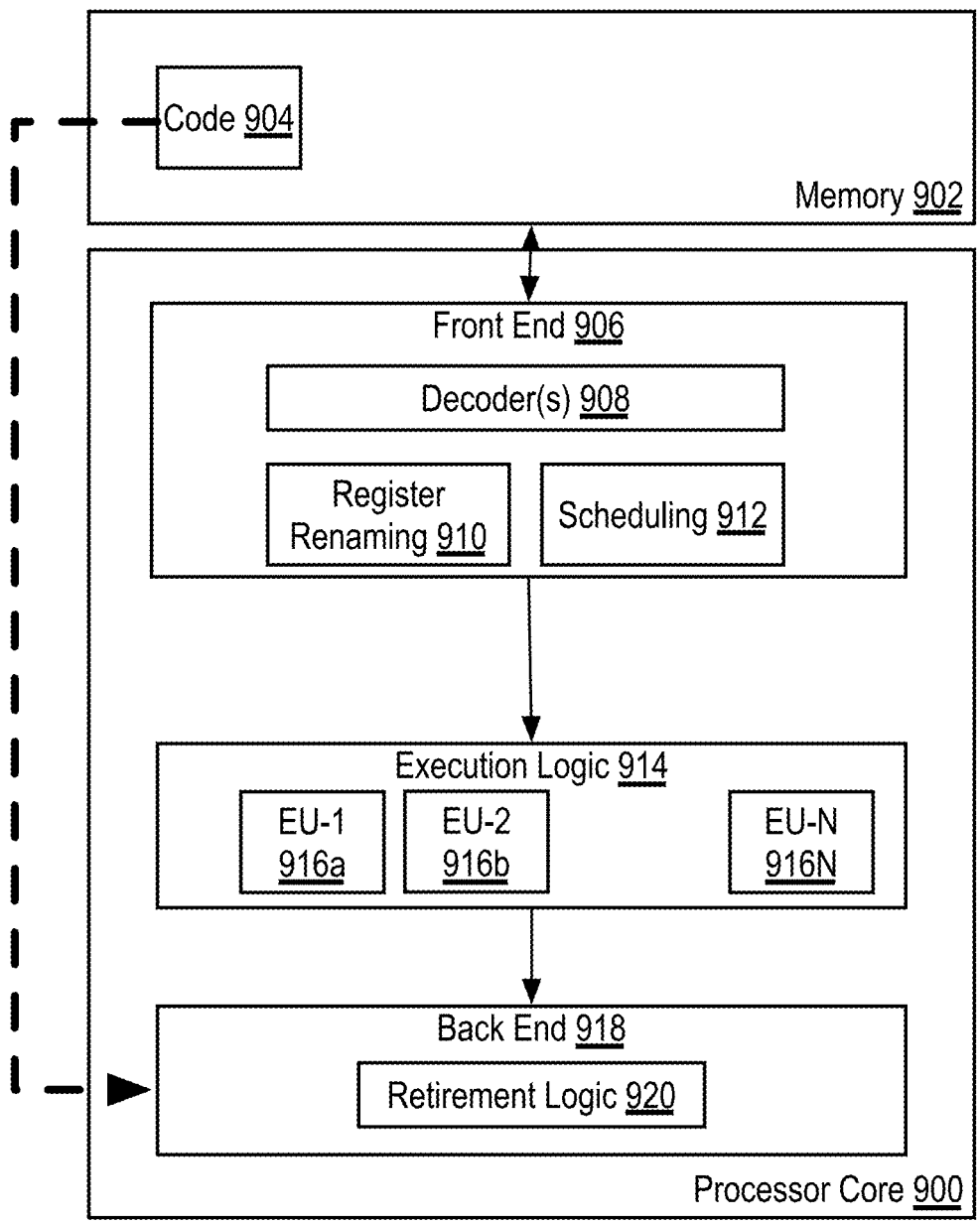
FIG. 9 is a block diagram illustrating an example processor core and memory according to at least one embodiment.
Figure 10:
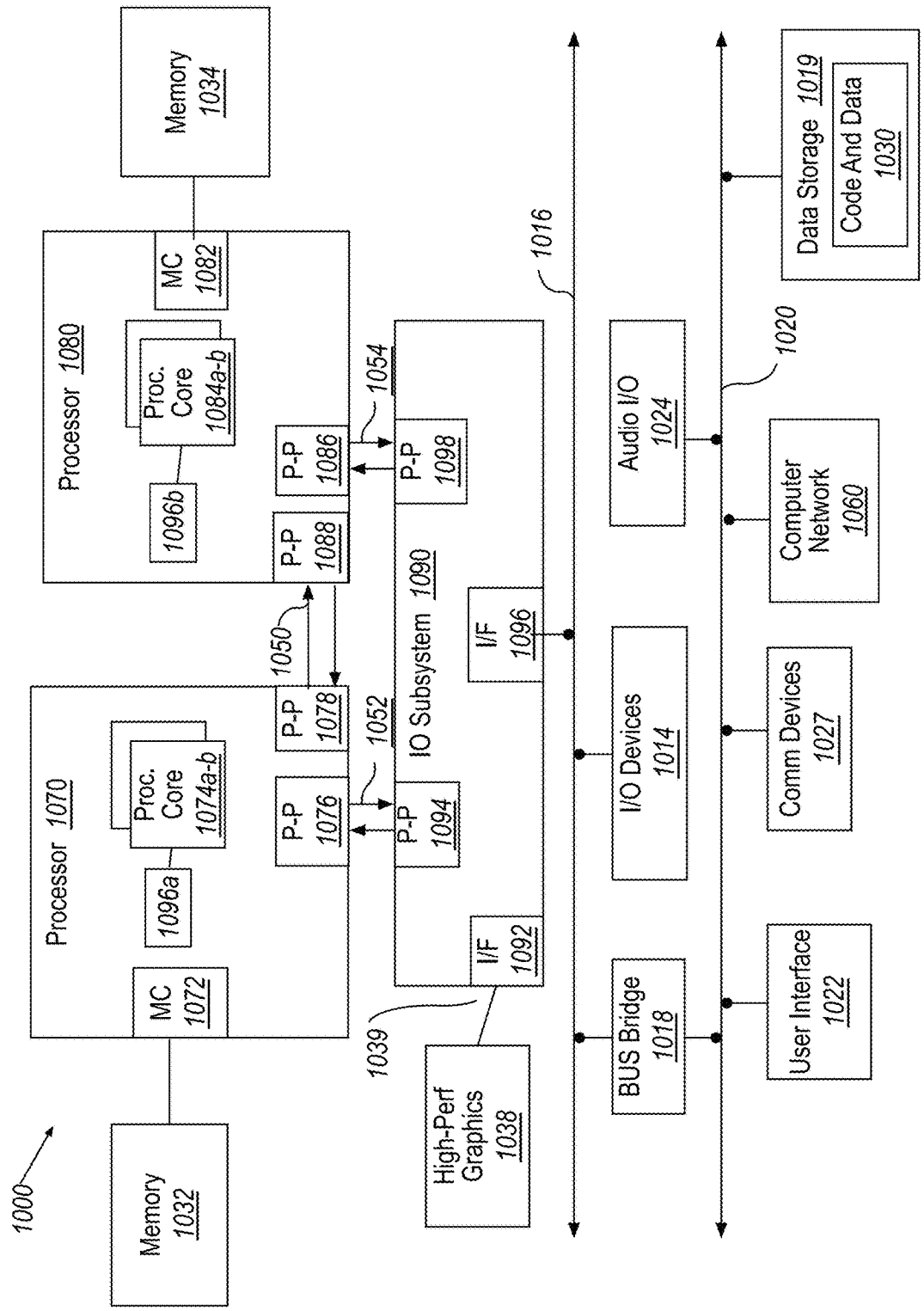
FIG. 10 is a block diagram of an example computer architecture according to at least one embodiment.

FIGS. 9-10 are block diagrams of example computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 9-10.

FIG. 9 is an example illustration of a processor according to an embodiment. Processor 900 is an example of a type of hardware device that can be used in connection with the implementations above. For example, processor 900 may be the same as processor 120 and/or processor 606 implementing collision-free hashing for accessing cryptographic computing metadata and for cache expansion in accordance with implementations of the disclosure. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular uses. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Frontend logic 906 also includes register renaming logic 910 and scheduling logic 912, which generally allocate resources and queue the operation corresponding to the instruction for execution.

Processor 900 can also include execution logic 914 having a set of execution units 916a, 916b, 916N, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but utilizes in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems or computing devices described herein may be configured in the same or similar manner as computing system 1000. For example, computing system 1000 may be the same as computing device 100 and/or computing device 600 implementing collision-free hashing for accessing cryptographic computing metadata and for cache expansion in accordance with implementations of the disclosure.

Processors 1070 and 1080 may be implemented as single core processors 1074a and 1084a or multi-core processors 1074a-1074b and 1084a-1084b. Processors 1070 and 1080 may each include a cache 1096a and 1096b used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 1070 and 1080 may also each include integrated memory controller logic (MC) 1072 and 1082 to communicate with memory elements 1032 and 1034, which may be portions of main memory locally attached to the respective processors. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with an input/output (I/O) subsystem 1090 via individual point-to-point interfaces 1052 and 1054 using point-to-point interface circuits 1076, 1086, 1094, and 1098. I/O subsystem 1090 may also exchange data with a high-performance graphics circuit 1038 via a high-performance graphics interface 1039, using an interface circuit 1092, which could be a PtP interface circuit. In one embodiment, the high-performance graphics circuit 1038 is a special-purpose processor, such as, for example, a high-throughput MIC processor, a network or communication processor, compression engine, graphics processor, GPGPU, embedded processor, or the like. I/O subsystem 1090 may also communicate with a display for displaying data that is viewable by a human user. In alternative embodiments, any or all of the PtP links illustrated in FIG. 10 could be implemented as a multi-drop bus rather than a PtP link.

I/O subsystem 1090 may be in communication with a bus 1016 via an interface circuit 1096. Bus 1016 may have one or more devices that communicate over it, such as a bus bridge 1018 and I/O devices 1014. Via a bus 1020, bus bridge 1018 may be in communication with other devices such as a user interface 1022 (such as a keyboard, mouse, touchscreen, or other input devices), communication devices 1027 (such as modems, network interface devices, or other types of communication devices that may communicate through a computer network 1060), audio I/O devices 1014, and/or a data storage device 1019. Data storage device 1019 may store code and data 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It can be appreciated that various components of the system depicted in FIG. 10 may be combined in a system-on-a-chip (SoC) architecture or in any other suitable configuration capable of achieving the functionality and features of examples and implementations provided herein.

The following examples pertain to further embodiments. Example 1 is an apparatus to facilitate collision-free hashing for accessing cryptographic computing metadata and for cache expansion. The apparatus of Example 1 comprises one or more processors to compute a plurality of hash functions that combine additions, bit-level reordering, bit-linear mixing, and wide substitutions, wherein each of the plurality of hash functions differs in one of the additions, the bit-level reordering, the wide substitutions, or the bit-linear mixing; and access a hash table utilizing results of the plurality of hash functions.

In Example 2, the subject matter of Example 1 can optionally include wherein each entry of the hash table comprises a plurality of key-value pairs, and wherein the results of the plurality of hash functions are utilized as a key for the hash table. In Example 3, the subject matter of any one of Examples 1-2 can optionally include wherein each hash function of the plurality of hash functions differs in their bit linear mixing steps. In Example 4, the subject matter of any one of Examples 1-3 can optionally include wherein the plurality of hash functions are keyed hash functions that share operations comprising the additions, the bit-level reordering, and the wide substitutions, but utilize different keys.

In Example 5, the subject matter of any one of Examples 1-4 can optionally include wherein the one or more processors are further to access a memory hierarchy where at least one level in the memory hierarchy comprises a plurality of cache units, wherein each cache unit of the plurality of cache units is accessed by computing outputs of different cryptographic hash functions from the plurality of hash functions. In Example 6, the subject matter of any one of Examples 1-5 can optionally include wherein the outputs of the different cryptographic hash functions are computed in parallel, and wherein the plurality of cache units are accessed in parallel using the outputs as indexes to the plurality of cache units.

In Example 7, the subject matter of any one of Examples 1-6 can optionally include wherein the plurality of hash functions further combine sequences of one of additions with carries or subtractions with borrows. In Example 8, the subject matter of any one of Examples 1-7 can optionally include wherein the wide substitutions comprise implementing S-boxes based on Galois Field (GF) inversion. In Example 9, the subject matter of any one of Examples 1-8 can optionally include wherein the hash table is to store metadata corresponding to cryptographic computing.

Example 10 is a method for facilitating collision-free hashing for accessing cryptographic computing metadata and for cache expansion. The method of Example 10 can include computing, by a processor, a plurality of hash functions that combine additions, bit-level reordering, bit-linear mixing, and wide substitutions, wherein each of the plurality of hash functions differs in one of the additions, the bit-level reordering, the wide substitutions, or the bit-linear mixing; and accessing, by the processor, a hash table utilizing results of the plurality of hash functions.

In Example 11, the subject matter of Example 10 can optionally include wherein each entry of the hash table comprises a plurality of key-value pairs, and wherein the results of the plurality of hash functions are utilized as a key for the hash table. In Example 12, the subject matter of any one of Examples 10-11 can optionally include the plurality of hash functions are keyed hash functions that share operations comprising the additions, the bit-level reordering, and the wide substitutions, but utilize different keys, and wherein each hash function of the plurality of hash functions differs in their bit linear mixing steps.

In Example 13, the subject matter of any one of Examples 10-12 can optionally include the method further comprising accessing a memory hierarchy where at least one level in the memory hierarchy comprises a plurality of cache units, wherein each cache unit of the plurality of cache units is accessed by computing outputs of different cryptographic hash functions from the plurality of hash functions. In Example 14, the subject matter of any one of Examples 10-13 can optionally include wherein the outputs of the different cryptographic hash functions are computed in parallel, and wherein the plurality of cache units are accessed in parallel using the outputs as indexes to the plurality of cache units.

In Example 15, the subject matter of any one of Examples 10-14 can optionally include wherein the wide substitutions comprise implementing S-boxes based on Galois Field (GF) inversion. In Example 16, the subject matter of any one of Examples 10-15 can optionally include wherein the hash table is to store metadata corresponding to cryptographic computing.

Example 17 is a non-transitory machine readable storage medium for facilitating collision-free hashing for accessing cryptographic computing metadata and for cache expansion. The non-transitory machine readable storage medium of Example 17 having stored thereon executable computer program instructions that, when executed by one or more processors, cause the one or more processors to perform operations comprising: computing, by the one or more processors, a plurality of hash functions that combine additions, bit-level reordering, bit-linear mixing, and wide substitutions, wherein each of the plurality of hash functions differs in one of the additions, the bit-level reordering, the wide substitutions, or the bit-linear mixing; and accessing, by the one or more processors, a hash table utilizing results of the plurality of hash functions.

In Example 18, the subject matter of Example 17 can optionally include wherein the plurality of hash functions are keyed hash functions that share operations comprising the additions, the bit-level reordering, and the wide substitutions, but utilize different keys, and wherein each hash function of the plurality of hash functions differs in their bit linear mixing steps.

In Example 19, the subject matter of Examples 17-18 can optionally include wherein the one or more processors to perform further operations comprising accessing a memory hierarchy where at least one level in the memory hierarchy comprises a plurality of cache units, wherein each cache unit of the plurality of cache units is accessed by computing outputs of different cryptographic hash functions from the plurality of hash functions. In Example 20, the subject matter of Examples 17-19 can optionally include wherein the outputs of the different cryptographic hash functions are computed in parallel, and wherein the plurality of cache units are accessed in parallel using the outputs as indexes to the plurality of cache units.

Example 21 is a system to facilitate collision-free hashing for accessing cryptographic computing metadata and for cache expansion. The system of Example 21 comprises a memory to store a hash table and one or more processors communicably coupled to the memory. In Example 21, the one or more processors of the system are to compute a plurality of hash functions that combine additions, bit-level reordering, bit-linear mixing, and wide substitutions, wherein each of the plurality of hash functions differs in one of the additions, the bit-level reordering, the wide substitutions, or the bit-linear mixing; and access the hash table utilizing results of the plurality of hash functions.

In Example 22, the subject matter of Example 21 can optionally include wherein each entry of the hash table comprises a plurality of key-value pairs, and wherein the results of the plurality of hash functions are utilized as a key for the hash table. In Example 23, the subject matter of any one of Examples 21-22 can optionally include wherein each hash function of the plurality of hash functions differs in their bit linear mixing steps. In Example 24, the subject matter of any one of Examples 21-23 can optionally include wherein the plurality of hash functions are keyed hash functions that share operations comprising the additions with carries, the bit-level reordering, and the wide substitutions, but utilize different keys.

In Example 25, the subject matter of any one of Examples 21-24 can optionally include wherein the one or more processors are further to access a memory hierarchy where at least one level in the memory hierarchy comprises a plurality of cache units, wherein each cache unit of the plurality of cache units is accessed by computing outputs of different cryptographic hash functions from the plurality of hash functions. In Example 26, the subject matter of any one of Examples 21-25 can optionally include wherein the outputs of the different cryptographic hash functions are computed in parallel, and wherein the plurality of cache units are accessed in parallel using the outputs as indexes to the plurality of cache units.

In Example 27, the subject matter of any one of Examples 21-26 can optionally include wherein the cryptographic hash function further combines sequences of one of additions with carries or subtractions with borrows. In Example 28, the subject matter of any one of Examples 21-27 can optionally include wherein the wide substitutions comprise implementing S-boxes based on Galois Field (GF) inversion. In Example 29, the subject matter of any one of Examples 21-28 can optionally include wherein the hash table is to store metadata corresponding to cryptographic computing.

Example 30 is an apparatus for facilitating collision-free hashing for accessing cryptographic computing metadata and for cache expansion according to implementations of the disclosure. The apparatus of Example 31 can comprise means for computing a plurality of hash functions that combine additions, bit-level reordering, bit-linear mixing, and wide substitutions, wherein each of the plurality of hash functions differs in one of the additions, the bit-level reordering, the wide substitutions, or the bit-linear mixing; and means for accessing a hash table utilizing results of the plurality of hash functions. In Example 31, the subject matter of Example 31 can optionally include the apparatus further configured to perform the method of any one of the Examples 11 to 16.

Example 32 is at least one machine readable medium comprising a plurality of instructions that in response to being executed on a computing device, cause the computing device to carry out a method according to any one of Examples 10-16. Example 33 is an apparatus for facilitating collision-free hashing for accessing cryptographic computing metadata and for cache expansion, configured to perform the method of any one of Examples 10-16. Example 34 is an apparatus for facilitating collision-free hashing for accessing cryptographic computing metadata and for cache expansion comprising means for performing the method of any one of claims 10 to 16. Specifics in the Examples may be used anywhere in one or more embodiments.

In the description above, for the purposes of explanation, numerous specific details are set forth in order to provide a thorough understanding of the described embodiments. It can be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their basic form, but processes can be added to or deleted from any of the methods and information can be added or subtracted from any of the described messages without departing from the basic scope of the present embodiments. It may be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments. The various appearances of "an embodiment," "one embodiment," or "some embodiments" are not all referring to the same embodiments. It should be appreciated that in the foregoing description of example embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments utilize more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
   one or more processors to:
   receive a physical address corresponding to memory communicably coupled to the one or more processors;
   compute a set of hash functions using a set of different indexes corresponding to the set of hash functions, wherein the set of hash functions combine additions, bit-level reordering, bit-linear mixing, and wide substitutions, and wherein each of the set of hash functions differs in the bit-linear mixing;
   access a plurality of cache units utilizing the set of hash functions;
   read different sets of the plurality of cache units in parallel, where a set of the different sets is obtained from each cache unit of the plurality of cache units; and
   responsive to the physical address being located in one of the different sets, return cache line data of the set corresponding to the set of the cache unit having the physical address.

2. The apparatus of claim 1, wherein the one or more processors to, responsive to the physical address being missing from the different sets, handle a cache miss.

3. The apparatus of claim 1, wherein the set of hash functions, the set of different indexes, and the plurality of cache units each comprise a same number of hash functions, indexes, and cache units.

4. The apparatus of claim 1, wherein the set of hash functions are keyed hash functions that share operations comprising the additions, the bit-level reordering, and the wide substitutions, but utilize different keys.

5. The apparatus of claim 1, wherein the memory comprises a memory hierarchy where at least one level in the memory hierarchy comprises the plurality of cache units.

6. The apparatus of claim 1, wherein the set of hash functions are computed in parallel, and wherein the plurality of cache units are accessed in parallel using the set of hash functions.

7. The apparatus of claim 1, wherein the set of hash functions further combine sequences of one of additions with carries or subtractions with borrows.

8. The apparatus of claim 1, wherein the wide substitutions comprise implementing S-boxes based on Galois Field (GF) inversion.

9. A method comprising:
receiving, by a processor, a physical address corresponding to memory communicably coupled to the processor;
computing a set of hash functions using a set of different indexes corresponding to the set of hash functions, wherein the set of hash functions combine additions, bit-level reordering, bit-linear mixing, and wide substitutions, and wherein each of the set of hash functions differs in the bit-linear mixing;
accessing a plurality of cache units utilizing the set of hash functions;
reading different sets of the plurality of cache units in parallel, where a set of the different sets is obtained from each cache unit of the plurality of cache units; and
responsive to the physical address being located in one of the different sets, returning cache line data of the set corresponding to the set of the cache unit having the physical address.

10. The method of claim 9, further comprising responsive to the physical address being missing from the different sets, handling a cache miss.

11. The method of claim 9, wherein the set of hash functions, the set of different indexes, and the plurality of cache units each comprise a same number of hash functions, indexes, and cache units.

12. The method of claim 9, wherein the set of hash functions are keyed hash functions that share operations comprising the additions, the bit-level reordering, and the wide substitutions, but utilize different keys.

13. The method of claim 9, wherein the memory comprises a memory hierarchy where at least one level in the memory hierarchy comprises the plurality of cache units.

14. The method of claim 9, wherein the set of hash functions are computed in parallel, and wherein the plurality of cache units are accessed in parallel using the set of hash functions.

15. The method of claim 9, wherein the set of hash functions further combine sequences of one of additions with carries or subtractions with borrows.

16. A non-transitory computer-readable storage medium having stored thereon executable computer program instructions that, when executed by one or more processors, cause the one or more processors to perform operations comprising:
receiving, by the one or more processors, a physical address corresponding to memory communicably coupled to the one or more processors;
computing a set of hash functions using a set of different indexes corresponding to the set of hash functions, wherein the set of hash functions combine additions, bit-level reordering, bit-linear mixing, and wide substitutions, and wherein each of the set of hash functions differs in the bit-linear mixing;
accessing a plurality of cache units utilizing the set of hash functions;
reading different sets of the plurality of cache units in parallel, where a set of the different sets is obtained from each cache unit of the plurality of cache units; and
responsive to the physical address being located in one of the different sets, returning cache line data of the set corresponding to the set of the cache unit having the physical address.

17. The non-transitory computer-readable storage medium of claim 16, wherein the operations further comprise responsive to the physical address being missing from the different sets, handling a cache miss.

18. The non-transitory computer-readable storage medium of claim 16, wherein the set of hash functions, the set of different indexes, and the plurality of cache units each comprise a same number of hash functions, indexes, and cache units.

19. The non-transitory computer-readable storage medium of claim 16, wherein the set of hash functions are keyed hash functions that share operations comprising the additions, the bit-level reordering, and the wide substitutions, but utilize different keys.

20. The non-transitory computer-readable storage medium of claim 16, wherein the memory comprises a memory hierarchy where at least one level in the memory hierarchy comprises the plurality of cache units.

* * * * *